US 6,640,548 B2

(12) United States Patent
Brushwood et al.

(10) Patent No.: US 6,640,548 B2
(45) Date of Patent: Nov. 4, 2003

(54) APPARATUS AND METHOD FOR COMBUSTING LOW QUALITY FUEL

(75) Inventors: John Samuel Brushwood, Oviedo, FL (US); Paul Pillsbury, Winter Springs, FL (US); John Foote, Sylacauga, AL (US); Andreas Heilos, Muelheim (DE)

(73) Assignee: Siemens Westinghouse Power Corporation, Orlando, FL (US)

( * ) Notice: Subject to any disclaimer, the term of this patent is extended or adjusted under 35 U.S.C. 154(b) by 20 days.

(21) Appl. No.: 09/963,282

(22) Filed: Sep. 26, 2001

(65) Prior Publication Data

US 2003/0056517 A1 Mar. 27, 2003

(51) Int. Cl.⁷ .................................................. F02C 7/22
(52) U.S. Cl. ...................... 60/776; 60/39.463; 60/742
(58) Field of Search ........................... 60/39.463, 776, 60/742

(56) References Cited

U.S. PATENT DOCUMENTS

| | | | |
|---|---|---|---|
| 3,577,877 A | 5/1971 | Warne | |
| 3,910,037 A | 10/1975 | Salkeld | |
| 4,151,712 A | 5/1979 | Martens et al. | |
| 4,253,301 A | * 3/1981 | Vogt | 60/39.463 |
| 4,278,064 A | 7/1981 | Regueiro | |
| 4,292,024 A | 9/1981 | Pobst | |
| 4,566,268 A | * 1/1986 | Hoffeins et al. | 60/39.463 |
| 4,677,829 A | 7/1987 | Archer et al. | |
| 4,977,740 A | * 12/1990 | Madden et al. | 60/39.463 |
| 5,351,477 A | * 10/1994 | Joshi et al. | 60/39.463 |
| 5,359,847 A | 11/1994 | Pillsbury et al. | |
| 5,404,711 A | 4/1995 | Rajput | |
| 5,657,632 A | 8/1997 | Foss | |
| 5,675,971 A | * 10/1997 | Angel et al. | 60/746 |
| 5,791,137 A | 8/1998 | Evans et al. | |
| 5,826,423 A | 10/1998 | Lockyer et al. | |
| 5,829,962 A | 11/1998 | Drasek et al. | |
| 5,924,275 A | 7/1999 | Cohen et al. | |
| 5,934,065 A | 8/1999 | Bronicki et al. | |
| 5,961,314 A | 10/1999 | Myhre et al. | |
| 5,978,525 A | 11/1999 | Shu et al. | |
| 6,024,561 A | 2/2000 | Kemp et al. | |
| 6,045,353 A | 4/2000 | VonDrasek et al. | |
| 6,060,719 A | 5/2000 | DiTucci et al. | |
| 6,201,029 B1 | 3/2001 | Waycuilis | |
| 6,202,601 B1 | 3/2001 | Ouellette et al. | |
| 6,223,522 B1 | 5/2001 | Iijima et al. | |
| 6,239,434 B1 | 5/2001 | Brown | |
| 6,244,857 B1 | 6/2001 | VonDrasek et al. | |

* cited by examiner

Primary Examiner—Ehud Gartenberg

(57) ABSTRACT

A gas turbine (12) capable of combusting a low quality gaseous fuel having a ratio of flammability limits less than 2, or a heat value below 100 BTU/SCF. A high quality fuel is burned simultaneously with the low quality fuel to eliminate instability in the combustion flame. A sensor (46) is used to monitor at least one parameter of the flame indicative of instability. A controller (50) having the sensor signal (48) as input is programmed to control the relative flow rates of the low quality and high quality fuels. When instability is detected, the flow rate of high quality fuel is automatically increased in relation to the flow rate of low quality fuel to restore stability.

11 Claims, 2 Drawing Sheets

APPARATUS AND METHOD FOR COMBUSTING LOW QUALITY FUEL

STATEMENT OF GOVERNMENT INTEREST

This invention was made with United States Government support under contract number DE-FC21-90MC25140 awarded by the Department of Energy. The United States Government has certain rights in this invention.

BACKGROUND OF THE INVENTION

This invention relates generally to the field of gas or combustion turbines, and specifically to an apparatus and method for combusting a low quality fuel in a gas turbine engine.

Gas turbines are commonly used for combusting fossil fuels in order to generate power in the form of the mechanical energy of a rotating shaft. The rotating shaft mechanical energy is then converted into electrical energy in an electrical power generator. Either gaseous or liquid fossil fuel may be combusted in a gas turbine. Known fuel gases include propane, hydrogen and methane-based fuels such as natural gas. Liquid fuels include kerosene, aviation fuel and diesel fuel. For optimal efficiency and reliability, the combustor of a gas turbine must be designed with particular attention given to the type of fuel or fuels to be burned, since each fuel has its own specific combustion characteristics, and such characteristics affect the operation, longevity and reliability of the gas turbine.

One variable to be considered when designing a combustor is the amount of heat released during the combustion of the fuel. Heating value Q is defined as the energy released during combustion of the fuel per unit volume of the fuel. FIG. 1 itemizes several fuel gases and lists the associated Q value in units of BTU per cubic foot. Another variable to be considered when designing a combustor is the flammability of the fuel. Each fuel will support the propagation of a flame at only a specific range of concentration in air. Above a rich flammability limit and below a lean flammability limit, the fuel will not support flame combustion. The flammability range is the fuel concentration range from the lean flammability limit to the rich flammability limit. FIG. 1 illustrates the ratio of flammability limits for the various fuel gases. The ratio of flammability limits is defined as the rich flammability limit divided by the lean flammability limit. One may appreciate that fuels with higher ratios of flammability limits may be able to tolerate greater fluctuations in combustion parameters with a lower chance of unanticipated flame-outs when burned in a gas turbine combustor.

Natural gas is the fuel of choice for most modern gas turbine applications. As can be seen in FIG. 1, natural gas has a relatively high heating value, 950 BTU/ft$^3$, and a mid-range ratio of flammability limits, thereby making it a good candidate for combustion in a gas turbine engine. Fuels with low heat value, such as low or medium energy coal gas, are considered acceptable fuels for combustion in a gas turbine so long as their ratio of flammability limits is sufficiently high, for example, at least equal to 2. Fuels referred to herein as high quality fuels are fuels that exhibit a ratio of flammability limits of 2 or more, and that have a heat value Q of at least 100 BTU/SCF. Fuels with low heating value and a low ratio of flammability limits, such as the low energy natural gas and blast furnace gas illustrated in FIG. 1, are generally considered to be unusable as fuel for a gas turbine engine. Such fuels are referred to herein as low quality fuels, meaning that they exhibit a ratio of flammability limits of less than 2, or that they have a heat value Q of below 100 BTU/SCF. The relatively high price of natural gas stimulates an ongoing interest in the use of lower cost fuels, such as gas produced by the gasification of low-grade biomass, by coal gasification or by petroleum coke gasification. Many of these fuel gases contain large amounts of moisture, carbon dioxide or other non-combustible compounds. The use of low heating value and/or narrow flammability range fuel requires special attention to combustor design. Current industrial gas turbine technology can effectively fire fuel gases with heating values as low as about 120 BTU/SCF and with a ratio of flammability of at least 2.

It is known to combust two different types of fuel in a single gas turbine. U.S. Pat. No. 5,359,847 issued to Pillsbury, describes a dual fuel ultra-low NO$_x$ combustor capable of operating on either a gaseous or liquid fuel. This design is optimized to reduce emissions of the oxides of nitrogen while burning high quality fuels at very lean fuel/air ratios.

U.S. Pat. No. 6,201,029 issued to Waycuilis, describes a gas turbine designed to operate on a low heating value fuel, such as may be obtained from a coal seam, landfill or sewage treatment plant. This design includes provisions for the supply of a high heating value fuel, such as natural gas, to supplement the supply of low heating value fuel. The combustion process is ignited with the high heating value fuel, then progressively more low heating value fuel is added to the fuel mixture. The patent describes a combustor specifically designed for burning the low heating value fuel and having a flame zone and an oxidation zone. The stability of the flame in this combustor is of concern. In addition to the special combustor design, this patent describes the preheating of the low heating value fuel in order to widen its flammability envelope, thereby providing additional stability to the combustion process.

It is known to combust low grade fuels and high grade fuels in separate combustion devices of a single power plant, as described in U.S. Pat. No. 5,934,065 issued to Bronicki, et al. Low grade fuels can be effectively combusted in a traditional burner due to the heat inertia of the burner walls, which are typically fire brick or other such material that is heated to an elevated temperature by the combustion process. The presence of such a radiant heat source provides stability for the flame. The approach of Bronicki requires combustor equipment that is separate from the gas turbine combustor, thereby increasing the capital cost of such a plant.

It is also known to utilize optical flame control to control the mixture of fuel and oxidizer in a burner, as described in U.S. Pat. No. 6,244,857 issued to VonDrasek, et al. The device of VonDrasek is used to control the relative flow rates of fuel and oxidizer in order to control a flame in a burner to be near stoichiometric conditions in order to limit the production of harmful emissions. The VonDrasek patent is not concerned with flame stability due to the thermal inertia available in the industrial burners of this application.

U.S. Pat. No. 5,978,525 issued to Shu, et al., describes a fiber optic sensor for detecting flashback occurrences in a combustor of a gas turbine. The device of Shu is limited to detecting the presence of a flame in a portion of the combustor where a flame is not normally present when the combustor is operating without flashback.

U.S. Pat. No. 6,024,561 issued to Kemp, et al., describes a flame detector for a burner that is used to alarm the absence of a flame, and also may be used to provide an input for the control of the air and fuel mixture flowing to the burner to achieve different output levels for the burner. The Kemp invention is not directed to the stability of the flame, nor is it directed to the combustion of low quality fuels.

SUMMARY OF THE INVENTION

A method of combusting fuel is described herein as including the steps of: providing a supply of a first fuel exhibiting a first quality parameter; providing a supply of a second fuel exhibiting a second quality parameter; combusting simultaneously in a combustor a flow of the first fuel and a flow of the second fuel; monitoring at least one parameter indicative of a level of stability of combustion in the combustor during the step of combusting; and controlling the flow of at least one of the first fuel and the second fuel in response to the at least one parameter. The parameter monitored may be electromagnetic radiation, pressure, or ionization potential in the combustor. The method may be applied when the first fuel exhibits a higher heat value than the second fuel, or when the first fuel exhibits a higher ratio of flammability limits than the second fuel. The method may further include increasing the relative flow rate of the first fuel compared to that of the second fuel when the step of monitoring indicates that combustion in the combustor is unstable.

An apparatus for combusting fuel is described herein as including: a combustion chamber; a compressor for supplying to the combustion chamber a flow of compressed air; a means for supplying to the combustion chamber a flow of a first fuel exhibiting a first quality parameter; a means for supplying to the combustion chamber a flow of a second fuel exhibiting a second quality parameter; a means for monitoring a level of stability of combustion in the combustion chamber; and a means for regulating at least one of the flow of compressed air, the flow of the first fuel and the flow of the second fuel in response to an output from the means for monitoring. The apparatus is further described as including: a sensor for providing a sensor signal responsive to the level of stability of combustion in the combustion chamber; a controller having the sensor signal as input and having an output; a device responsive to the controller output for regulating at least one of the flow of compressed air, the flow of the first fuel and the flow of the second fuel. The sensor may be an electromagnetic energy sensor, a pressure sensor, or a conductivity sensor.

BRIEF DESCRIPTION OF THE DRAWINGS

Embodiments are shown by way of example in the accompanying drawings wherein.

DETAILED DESCRIPTION OF THE INVENTION

Figure 1:
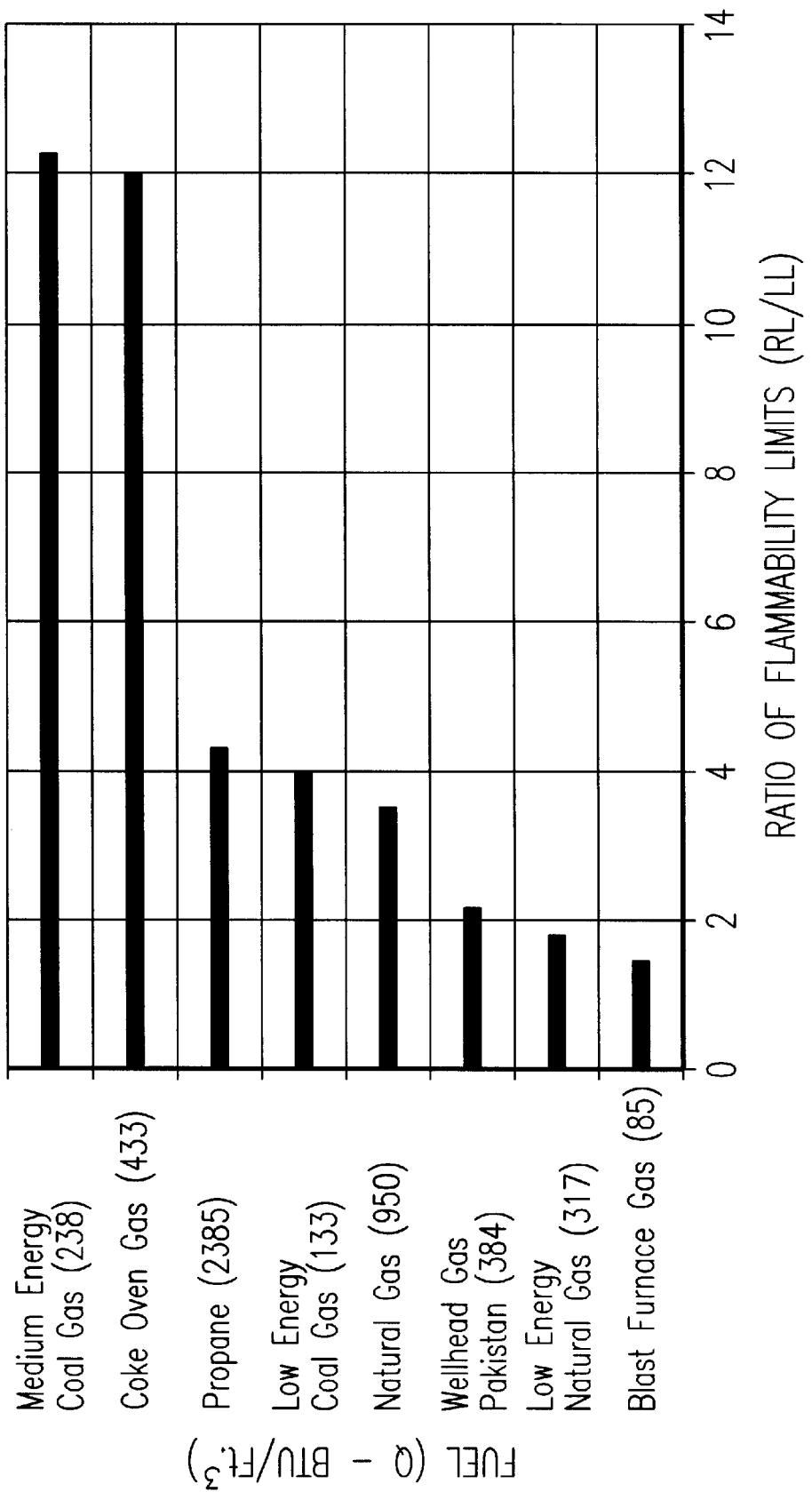
FIG. 1 is a graph illustrating the ratio of flammability limits for a variety of fuel gases known in the prior art.
Figure 2:
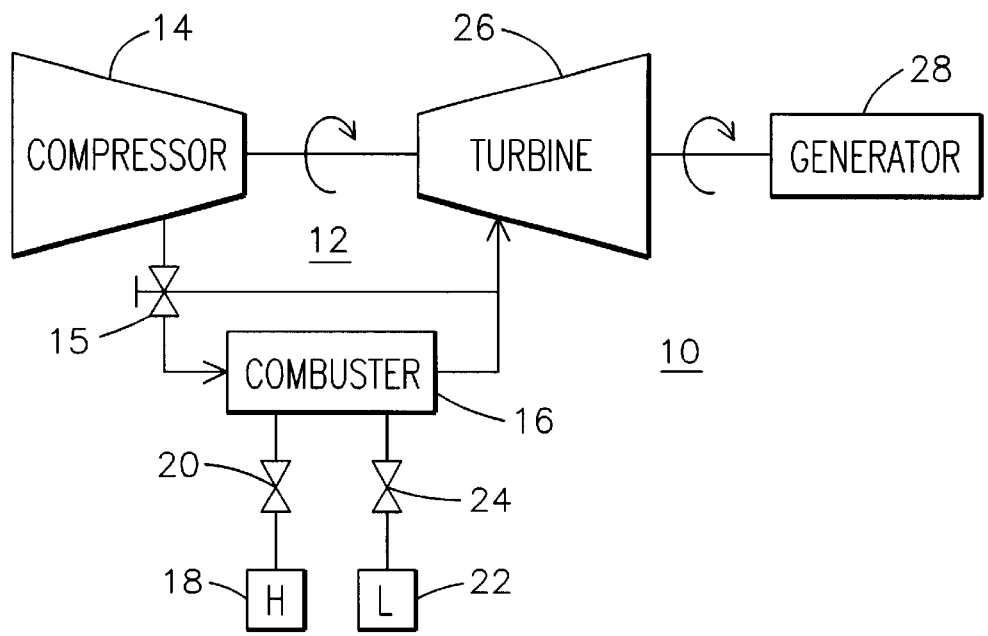
FIG. 2 is a schematic illustration of a gas turbine device used to combust both a high quality fuel and a low quality fuel.

Apparatus 10 of FIG. 2 includes a gas turbine assembly 12 capable of reliable operation while combusting a low quality gaseous fuel L. A compressor 14 provides a flow of compressed pressurized air or other oxidizer to combustor 16. A bypass valve 15 or other means for regulating the flow rate of the pressurized air may be provided. A first fuel supply 18 provides a flow of high quality fuel H to combustor 16 through control valve 20, while a second fuel supply 22 provides a flow of low quality gaseous fuel L through control valve 24 to the combustor. The fuels are combusted in combustor 16 to provide a flow of hot combustion gas to a turbine 26 where the thermal energy is converted to mechanical energy for driving an electrical power generator 28 or for other purposes may be known in the art.

Low quality fuel L may be any of the fuels described above as exhibiting a ratio of flammability limits of less than 2, or having a heat value Q of below 100 BTU/SCF. For example, low quality gaseous fuels may be produced by the gasification of low-grade biomass, by coal gasification or by petroleum coke gasification. High quality fuel H may be any fuel that exhibits a ratio of flammability limits of 2 or more, and that has a heat value Q of at least 100 BTU/SCF. For example, high quality fuels may include hydrogen, natural gas, or propane. High quality fuel H may further include a liquid fuel such as kerosene, aviation fuel, number 2 diesel fuel, etc. The relative flow rates of the high quality fuel 18 and the low quality fuel 22, and/or the flow rate of the compressed air, are controlled to ensure stability of combustion within the combustor 16, as more fully described below with reference to FIG. 3.

Figure 3:
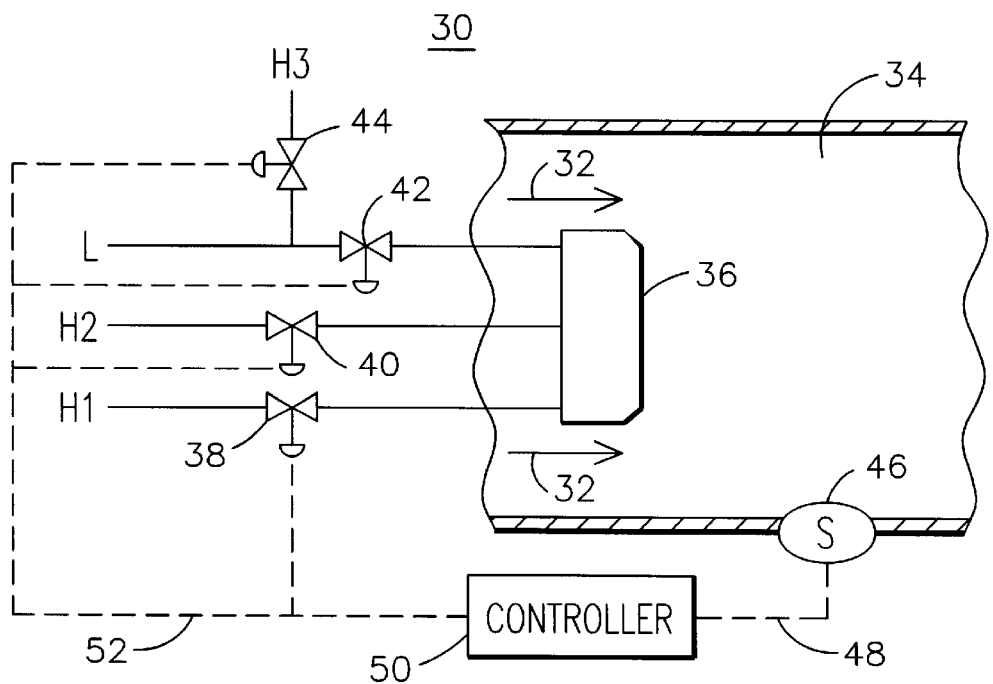
FIG. 3 is a schematic illustration of a gas turbine combustor as may be used in the gas turbine device of FIG. 2.

FIG. 3 is a schematic illustration of one embodiment of a combustor system 30 that may be used with the apparatus 10 of FIG. 2. A supply of compressed air 32 is delivered to a combustion chamber 34. A fuel nozzle 36 disperses fuel into the compressed air 32 to generate flame combustion within the combustion chamber 34. The fuel nozzle 36 is supplied with fuel from a plurality of fuel sources. A first supply of a high quality fuel H1 is provided through flow control valve 38. A second supply of high quality fuel H2 is provided through flow control valve 40. The second high quality fuel supply H2 may from the same source as the first high quality fuel supply H1, with the two parallel flow circuits being used to cover a wider range of flow rates than could be supplied with a single flow circuit with a limited supply pressure and a minimum required outlet nozzle pressure drop. A supply of low quality fuel L is provided through flow control valve 42. A third supply of a high quality fuel H3 may be added to the supply of low quality fuel through flow control valve 44. One may appreciate that the point of delivery of fuel H3 may be either upstream or downstream of valve 42. Furthermore, each of the high quality fuels may be provided from the same source, or they may be different fuels having different combustion parameters.

A sensor 46 is provided for monitoring at least one parameter indicative of a level of stability of combustion in the combustion chamber 34. A flame is considered unstable if it exhibits oscillations of a magnitude that may lead to flameout or that otherwise may damage the combustor if not arrested. Sensor 46 provides a sensor signal 48 responsive to the level of stability of combustion in the combustion chamber 34. One skilled in the art may appreciate that sensor 46 may include both a sensing element and a transmitter for amplifying and transmitting the sensor signal 48. Any one or several parameters may be monitored to detect the level of stability of the flame, including for example, electromagnetic radiation such as visible light, ultraviolet light or infrared radiation, pressure, and/or conductivity or ionization potential. For example, an Edison UV Flame Scanner Series 52878, Part No. 46048-1 available from Schramm Industries may be used. Alternatively, a Columbia High Intensity Acoustic Sensor, Model 765M27 available from Columbia Research Laboratories may be used, suitably mounted to eliminate false signals from the sense tube, such as by using the so-called infinite tube mounting. Alternatively, a Vibrometer Piezoelectric Pressure Transducer Type CP 231 may be used. Pulses or oscillations in a sensed parameter may indicate instability in the flame. For example, if an unsteady pressure within the combustion chamber 34 of greater than plus or minus 1 psi peak-to-peak at a frequency of less than 100 Hz or an unsteady pressure of greater than plus or minus 1.5 psi peak-to-peak at a frequency of greater than 100 Hz is detected, such measurement may indicate the onset of instability. The sensor signal 48 is provided as an input to a controller 50. Controller 50 may be a computer or other type of analog or digital processing device that is programmed to provide one or more output signals 52 for controlling the position of valves 38, 40, 42, 44. Controller output may also be used to control the flow rate of compressed air being supplied from the compressor 14 to the combustion chamber 34.

The combustor system 30 may be operated to maximize its use of low quality fuel, while using high quality fuel only as necessary to augment the total power output and/or to avoid flame instability. Preferably, the gas turbine assembly 12 may also be designed to operate on only high quality fuel for extended periods, if necessary. In one scenario, high quality fuel H1 is used as a pilot fuel to initiate combustion. A flow of high quality fuel H2 is then initiated and increased until a desired power level is achieved, such as full load or a defined partial load condition. A flow of low quality fuel L may then be initiated and gradually increased so long as the flame remains stable, as indicated by sensor signal 48. One or both of the flows of H1 and H2 may be decreased as the rate of flow of low quality fuel L increases. Depending upon the types of fuels and the conditions of combustion, there may be an upper limit to the amount of low quality fuel L that can be combusted without causing instability in the flame. Once such a limit is exceeded, the sensor will detect fluctuations in the monitored parameter(s) and sensor signal 48 will provide such information to controller 50. Controller 50 contains programmed instructions for eliminating the instability by decreasing the rate of flow of low quality fuel L and/or increasing the rate of flow of high quality fuel H1 and/or H2. The controller 50 may also be used to control the flow rate of compressed air 32 being provided to the combustion chamber 34. Controller 50 provides appropriate control signals 52 to the respective control valves to effect such flow rate changes. Stable combustion conditions are reestablished by increasing the relative flow rate of the high quality fuel compared to that of the low quality fuel, with or without a change in the flow rate of the compressed air 32.

An alternate control scheme may be implemented by controlling an amount of high quality fuel H3 provided to mix with the low quality fuel L. High quality fuel supply H2 may be reduced or terminated once the engine is operating on low quality fuel L so long as the flame in the combustion chamber 34 remains stable. Should flame instability be detected by sensor 46, controller 50 may be programmed to further open control valve 44 to increase the amount of high quality fuel H3 that is mixed with low quality fuel L.

A supply of low quality fuel may vary in availability and in quality from time to time. For example, gas produced from bio-mass may vary daily or seasonally in quantity and/or in chemical composition as the temperature and/or the moisture content of the bio-mass bed changes. A gas turbine designed in accordance with this invention may be used to combust such bio-mass gas along with a high quality gaseous fuel. Unlike prior art combustor designs, the combustor system 30 of the present invention will automatically react to such changes in the low quality fuel in order to maintain stable combustion conditions. For example, a combustor may be designed to burn a maximum expected flow rate of low quality fuel having nominal combustion properties. For this design basis condition, a predetermined flow rate of a high quality fuel may be needed to ensure the stability of the flame. During operation of the combustor, the actual flow rate of low quality fuel may vary from the maximum expected value, and the combustion properties of the gas may vary from nominal values. In the event that the quality of the low quality fuel degrades below a nominal value, the flame in the combustion chamber may become unstable. Such instability would be detected by sensor 46, and the amount of high quality fuel automatically increased through the programmed action of controller 50 to eliminate the instability.

Controller 50 may be programmed to select a minimum amount of high quality fuel that is necessary to avoid flame instability. A test sequence may be programmed in the controller 50 to reduce periodically the flow rate of high quality fuel to a level that first induces instability in the flame. Once such instability is detected, controller 50 may then be programmed to increase the flow rate of high quality fuel by a predetermined amount, such as by ten percent or other value determined experimentally. In this manner, an improvement in the quality of the low quality fuel may be reflected in a decrease in the amount of high quality fuel being consumed.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. A method of combusting fuel comprising:
   providing a supply of a first fuel exhibiting a first quality parameter;
   providing a supply of a second fuel exhibiting a second quality parameter;
   combusting simultaneously in a combustor a flow of the first fuel and a flow of the second fuel;
   monitoring at least one parameter Indicative of a level of stability of combustion in the combustor during the step of combusting; and
   controlling relative flow rates of the first fuel and the second fuel in response to the at least one parameter.

2. The method of claim 1, wherein the step of monitoring at least one parameter further comprises monitoring electromagnetic radiation in the combustor.

3. The method of claim 1, wherein the step of monitoring at least one parameter further comprises monitoring pressure in the combustor.

4. The method of claim 1, wherein the step of monitoring at least one parameter further comprises monitoring ionization potential in the combustor.

5. The method of claim 1, wherein the first fuel exhibits a higher heat value than the second fuel, and further comprising increasing the relative flow rate of the first fuel compared to that of the second fuel when the step of monitoring the at least one parameter Indicates that combustion in the combustor is unstable.

6. The method of claim 1, wherein the first fuel exhibits a higher ratio of flammability limits than the second fuel, and further comprising increasing the relative flow rate of the first fuel compared to that of the second fuel when the step of monitoring the at least one parameter indicates that combustion in the combustor is unstable.

7. The method of claim 1, wherein the first fuel is a high quality fuel and the second fuel is a low quality fuel, and further comprising:

initiating combustion in the combustor with only the first fuel;

after stable combustion is established with only the first fuel, initiating the flow of the second fuel;

decreasing the flow of the first fuel relative to the flaw of the second fuel to a point whereat the at least one parameter indicates instability; and increasing the flow of the first fuel relative to the flow of the second fuel to eliminate the instability.

8. The method of claim 7, wherein the flow of the first fuel relative to the flow of the second fuel is increased by a predetermined amount above the point whereat the at least one parameter indicates instability.

9. A method of combusting fuel, the method comprising:

simultaneously combusting a low quality fuel and a high quality fuel in a combustor;

monitoring a parameter responsive to combustion instability conditions in the combustor; and controlling the relative amounts of low quality fuel and high quality fuel being combusted in the combustor in response to the parameter.

10. The method of claim 9, further comprising:

monitoring pressure in the combustor to detect combustion instability; and increasing the flow rate of the high quality fuel in relation to the flow rate of the low quality fuel in response to detecting combustion instability.

11. The method of claim 9, further comprising:

reducing the amount of the high quality fuel in relation to the amount of the low quality fuel until the parameter indicates combustion instability in the combustor; and increasing the amount of the high quality fuel in relation to the amount of the low quality fuel to eliminate the combustion instability.

* * * * *